US007668449B2

(12) United States Patent
Saugier et al.

(10) Patent No.: US 7,668,449 B2
(45) Date of Patent: Feb. 23, 2010

(54) BARREL OF VARIABLE FOCAL LENGTH LENS

(75) Inventors: Eric Saugier, Villard Bonnot (FR); Jean-Luc Diot, Grenoble (FR); Fabrice Mee, Monteynard (FR)

(73) Assignee: STMicroelectronics SA, Montrouge (FR)

( * ) Notice: Subject to any disclaimer, the term of this patent is extended or adjusted under 35 U.S.C. 154(b) by 345 days.

(21) Appl. No.: 11/534,141

(22) Filed: Sep. 21, 2006

(65) Prior Publication Data

US 2007/0072065 A1 Mar. 29, 2007

(30) Foreign Application Priority Data

Sep. 23, 2005 (FR) .................................. 05 52841

(51) Int. Cl.
*G03B 17/00* (2006.01)
(52) U.S. Cl. ..................... 396/72; 359/694; 359/704
(58) Field of Classification Search ................ 396/535, 396/72; 348/373, 86, 87; 359/230, 272, 359/666, 695, 704
See application file for complete search history.

(56) References Cited

U.S. PATENT DOCUMENTS

| 3,745,049 A | 7/1973 | Kaye ........................... 136/173 |
| 3,945,193 A | 3/1976 | Yasuda et al. ............. 58/23 BA |
| 4,402,779 A * | 9/1983 | Levy ........................... 156/245 |
| 5,689,738 A * | 11/1997 | Uziie et al. .................. 396/79 |
| 6,208,808 B1 * | 3/2001 | DiRisio ......................... 396/6 |
| 6,271,465 B1 * | 8/2001 | Lacey ......................... 174/358 |
| 6,469,844 B1 * | 10/2002 | Iwase et al. ................. 359/819 |
| 6,589,688 B2 * | 7/2003 | Jørgensen et al. ............. 429/96 |
| 6,624,432 B1 * | 9/2003 | Gabower et al. ......... 250/515.1 |
| 7,052,798 B2 * | 5/2006 | Kaelin et al. .................. 429/96 |
| 7,430,370 B2 * | 9/2008 | Kato et al. ..................... 396/89 |

FOREIGN PATENT DOCUMENTS

| JP | 2000287913 A | * | 10/2000 |
| JP | 2005013277 A | * | 1/2005 |
| WO | 2004/077125 | | 9/2004 |

* cited by examiner

*Primary Examiner*—Rodney E Fuller
*Assistant Examiner*—Linda B Smith
(74) *Attorney, Agent, or Firm*—Lisa K. Jorgenson; Harold H. Bennett, II; Seed IP Law Group PLLC

(57) ABSTRACT

A barrel for an electrically-controllable variable focal length lens in a button-battery type housing includes a hollow isolating cylindrical tube with an inner diameter substantially equal to that of the lens housing, with one or bumps extending radially towards the inside of the tube and forming bearing surfaces for the lens periphery in a same radial plane. First metallizations extend on at least one of the bearing surfaces and therefrom into first channels formed in the internal wall of the tube towards at least one end of the tube, and second metallizations, each of which forms a contact area on the internal surface of the tube to bear against the lateral surface of the lens and extends towards at least one end of the cylinder.

21 Claims, 2 Drawing Sheets

United States Patent US 7,668,449 B2

BARREL OF VARIABLE FOCAL LENGTH LENS

BACKGROUND OF THE INVENTION

1. Field of the Invention

The present invention generally relates to a photographic lens mount, and more specifically a barrel for a variable focal length lens.

The present invention applies, in particular, to miniaturized objectives of photographic devices or cameras such as those used in photographic devices associated with cellular phones, in which an image is formed on a semiconductor chip comprising an optical sensor network.

2. Description of the Related Art

It is often desired to associate an objective, having a variable focal length, with an image sensor, to enable focusing or zoom effect. Conventionally, this is performed by arranging one or several lenses in a barrel comprising parts mobile with respect to one another, generally, in connection with a rotation of barrel elements which causes a relative shifting between the lenses forming the objective.

Electrically-controlled variable focal length optical systems having no mobile parts, such as electrowetting lenses, have been developed. Such lenses have a focal length which varies according to an applied voltage. Lenses with a variable focal length are being developed, which, as seen from the outside, are in the same housing type as button batteries. Such electrowetting lenses are for example available from VARI-OPTIC Company.

An example of button-battery type variable focal length lens housing is illustrated in FIGS. 1A to 1C, in which FIG. 1A is a top view, FIG. 1B shows the contour of a transverse cross-section, and FIG. 1C is a bottom view. The central portion of the structure corresponds to the optical portion and comprises an upper transparent plate 1 and a lower transparent plate 2 between which is arranged the optical system with a variable focal length. Upper peripheral portion 3, lateral portion 5, and lower end periphery 6 correspond to a first metal surface forming a first electrode. Intermediary portion 8 between the external peripheral portion and central plate 2 on the lower surface side corresponds to a second metal surface forming a second electrode. Often, upper and lower portions 4 and 8 are not planar and comprise respective bumps 11 and 12. On the lower surface side, an insulating crown 14 separating the two electrodes can be seen.

BRIEF SUMMARY OF THE INVENTION

An embodiment of the present invention provides a lens mount or barrel enabling positioning and connecting one or several lenses of button-battery type such as that illustrated in FIGS. 1A to 1C, with no welding of wires or flexible circuits.

Another embodiment of the present invention provides such a barrel that may contain two lenses with a variable focal length.

Another embodiment of the present invention provides such a barrel that can be simply assembled with other barrels containing electrically-controllable fixed focal length or variable focal length lenses.

Another embodiment of the present invention provides such a barrel which enables simple and inexpensive assembly.

An embodiment of the present invention provides a barrel for an electrically-controllable variable focal length lens in a button-battery type housing, the barrel comprising a hollow isolating cylindrical tube with an inner diameter substantially equal to that of the lens housing, preferably at least two bumps extending radially towards the inside of the tube and forming bearing surfaces for the lens periphery in a same radial plane, first metallizations extending on at least one of said bearing surfaces and therefrom into first channels formed in the internal wall of the tube towards at least one end of the tube, and second metallizations, each of which forms a contact area on a portion of the internal surface of the tube to bear against the lateral surface of the lens and extends towards said at least one end of the cylinder.

According to an embodiment of the present invention, third metallizations are arranged in second channels extending from one end to the other of the internal tube wall.

According to an embodiment of the present invention, the first metallizations extend towards both ends of the tube.

According to an embodiment of the present invention, the first, second, and third metallizations extend to the ends of the tube and on end surfaces of the tube.

According to an embodiment of the present invention, before assembly of a lens in a button-battery type housing, a drop of conductive glue is deposited at each location where there must be a contact between a metallization and the stack housing.

According to an embodiment of the present invention, each first conductive bump comprises a groove between the bearing surface with the lens housing and the tube wall to avoid a short-circuit.

According to an embodiment of the present invention, the barrel contains an electrically-controllable variable focal length lens and at least another electrically-controllable variable focal length lens or a fixed lens.

An embodiment of the present invention also aims at a photographic device comprising a barrel such as hereabove described.

The foregoing and other features and advantages of the present invention will be discussed in detail in the following non-limiting description of specific embodiments in connection with the accompanying drawings.

DETAILED DESCRIPTION OF THE INVENTION

Figure 2A:
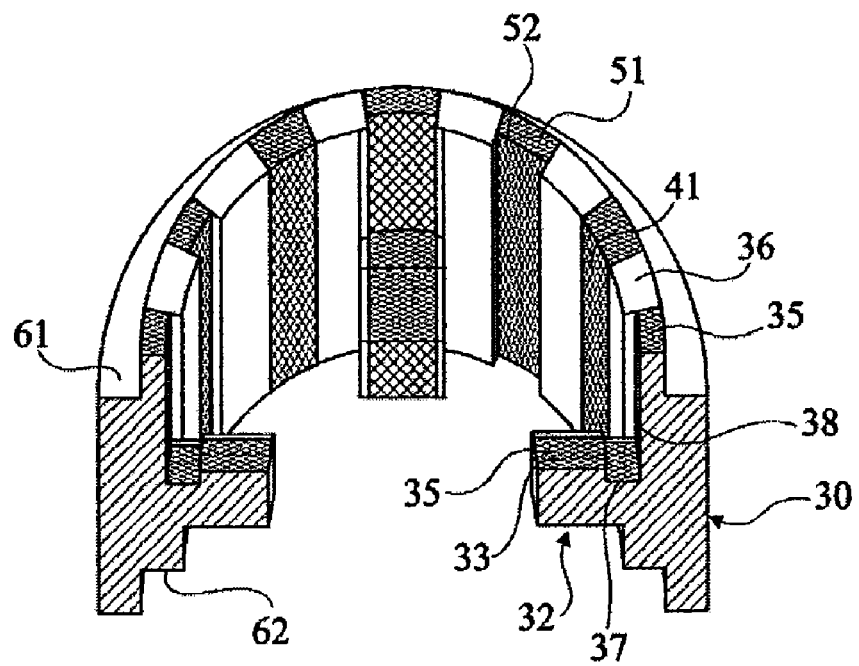
FIGS. 2A and 2B respectively are a half cross-section perspective view of barrel according to an embodiment of the present invention, and a top view of this same barrel.
Figure 2B:
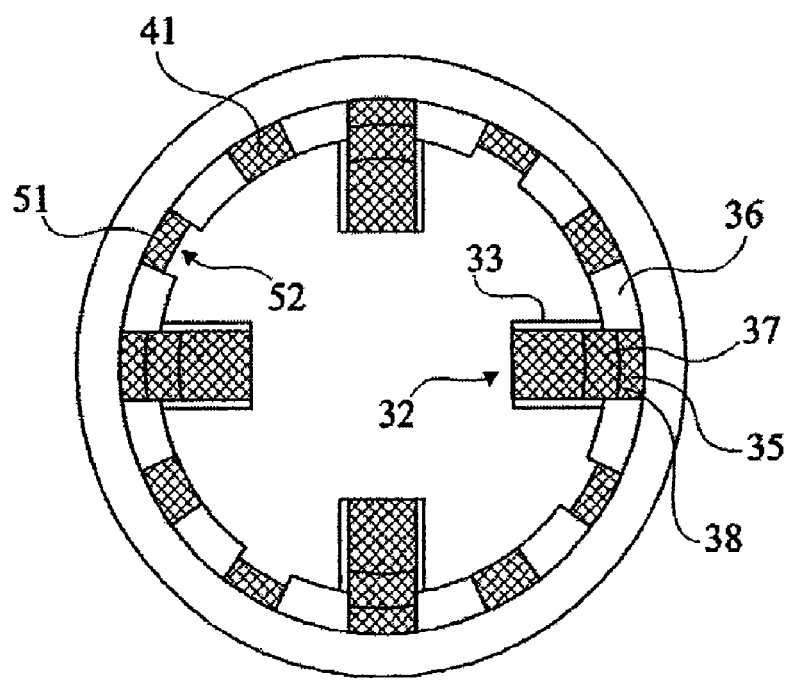

FIGS. 2A and 2B are simplified views of an example of a barrel or of a barrel portion according to the present invention. In the following description, a barrel will be mentioned, but it should be noted that a full barrel may comprise other elements or that several parts of the type shown in FIGS. 2A-2B may be assembled to form a full barrel.

A barrel according to an embodiment of the present invention is formed from a cylindrical tube 30 made of an insulating material. Inside of the tube are preferably formed at least two protruding bumps 32, four in the shown embodiment, three of which are visible in the half cross-section view of FIG. 2A. The bumps 32 extend towards the inside of the tube from the internal wall thereof. Each bump comprises a platform 33. Platforms 33 are located in a same plane orthogonal to the tube axis and are intended to be used as a bearing surface for portion 8 of the second electrode of a button-battery type lens. Each platform 33 is coated with a metallization 35 symbolically shown by crossed hatchings. Metallization 35 extends on platform 33 and rises substantially along a generator line of the tube wall up to the upper end surface 36 of the tube. Preferably, as shown, each bump 32 comprises on its upper surface side, in the vicinity of its junction with the tube wall, a groove 37 to avoid any short-circuit between metallization 35 and lower portion 6 of the first electrode of the button-battery type housing. Further, the portion of metallization 35 rising from the upper platform surface to upper portion 36 of the tube is formed in a channel 38 formed in the internal tube wall, to avoid any short-circuit between metallization 35 and periphery 5 of the first electrode of the button-battery type lens. Thus, bumps 32 and metallizations 35 altogether enable, on the one hand, positioning of the button-battery type lens in cylindrical tube 30 and, on the other hand, connection of the second electrode of the button-battery type lens and the rise of this connection to the upper surface of a hollow tube that can be in contact with another element intended to ensure the necessary connections. Of course, this structure is likely to have various alternatives. Other bump shapes may be adapted to other shapes of button-battery type housings. Further, according to the envisaged assembly type, metallization 35 may either, as described, rise up to the upper surface of the hollow tube, or descend to the lower surface of the hollow tube, or both.

The contact with the first electrode of the button-battery type housing is taken at the housing periphery by metallizations 41 which extend on the lateral internal tube surface and which, preferably, rise on upper surface 36 of the tube. For simplicity, metallization 41 has been shown as a track of uniform width. In fact, a widening may be provided at the level where this metallization must be in contact with the lateral surface of the button-battery type housing. In the shown example, four metallizations are provided although, theoretically, a single one is necessary. Similarly, a single one of the four platforms 33 requires a metallization 35. Also, in the representation of FIG. 2A, track 41 has been shown as extending along the entire height of tube element 30. Of course, according to implementations, this metallization may extend only towards the high tube portion, only towards the low tube portion, or towards both.

Finally, for the case where an assembly of several tube portions such as that of FIG. 2A is provided to form a barrel containing several electrically-controlled variable focal length lenses, track intended to run towards the other lenses arranged in the other tube portions may be provided. For this purpose, metal tracks 51 arranged in channels or recesses 52 are provided, each of which substantially extends along a cylinder generatrix.

Figure 1A:
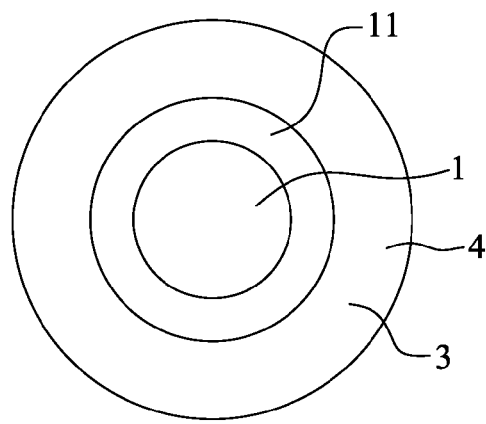
FIGS. 1A, 1B, and 1C, previously described, show in top view, in simplified side view, and in bottom view an example of an electrically-controllable variable focal length lens in a housing of button-battery type, according to known art.
Figure 1B:
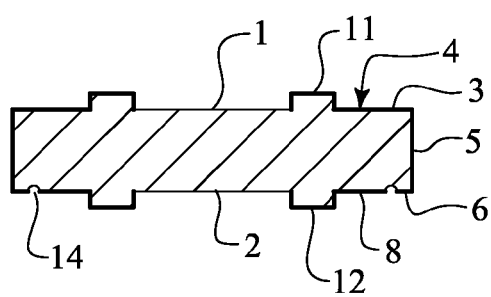
Figure 1C:
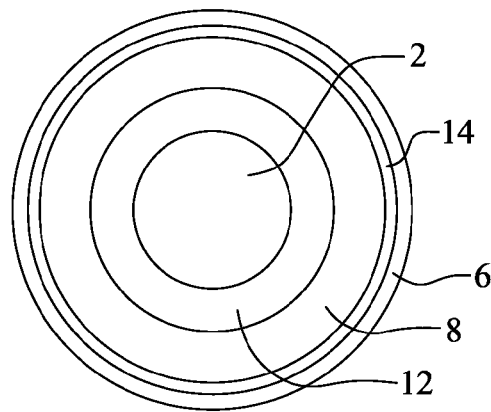

Thus, it can be seen that it is simple to stack several tube elements such as that of FIG. 1, by providing any possible assembly mode between two tubes, for example, by forming a shoulder on the upper portion side and/or a shoulder on the lower tube portion, each shoulder being intended to nest with a complementary shoulder of a tube portion to be assembled. In FIG. 2A, it can be seen that a small upper crown portion of the tube is hollowed to form a flat 61 and that a small lower crown portion of the tube is hollowed to form a flat 62 and enable a conventional assembly type. A bell-shaped joining may also be provided to improve the lens centering from one barrel to another.

The assembly of a button-battery type housing lens in the barrel illustrated in FIG. 2A may be readily performed by force. It may also be provided to block the lenses in their position by means of isolating rings. Or, preferably, before arranging of the lenses, a drop of conductive glue is deposited on each of flat parts 33 of bumps 32 as well as on the portion of each of tracks 41 which must contact the lens periphery.

The present invention is likely to have various alterations, modifications, and improvements which will readily occur to those skilled in the art. Several tube portions such as that illustrated in FIGS. 2A and 2B may be assembled. The upper or lower end portions may be arranged on parts specifically designed for an adaptation with the other elements of a system. Some of the parts may contain fixed lenses, or fixed lenses and a lens with a variable focal length. It should further be noted that, in a part of the type of that in FIGS. 2A and 2B, an approximately symmetrical structure may be provided, comprising first bumps comprising first platforms located in a same upward-facing plane and second bumps comprising second platforms located in a same downward-facing plane to insert in a same barrel two variable focal length lenses of button-battery type with a determined spacing between them, one from the bottom and the other one from the top.

The way to form the conductive tracks in isolating tubes has not been described in detail since various ways of doing are known by those skilled in the art. According to a first method, the tube is made of a plastic matter that can be sensitized by a laser beam. After this, by dipping in a melt, the sensitized portions are metallized. According to another method, a double injection is performed. A plastic matter on which a metallization is not likely to bind is first injected into a first mould, after which the obtained part is placed in a second mould in which a plastic matter which will "catch" with a metal in a non-electrolytic coating melt is injected. Other methods may be envisaged.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A barrel for an electrically-controllable variable focal length lens in a button-battery type housing, comprising:
    a hollow isolating cylindrical tube of a dielectric material with an inner diameter substantially equal to an outer diameter of the lens housing;
    at least two bumps extending radially towards the inside of the tube and forming bearing surfaces for a periphery of the lens in a same radial plane;
    a first metallization extending on at least one of said bearing surfaces and therefrom into a first channel formed in an internal wall of the tube towards at least one end of the tube; and
    a second metallization that forms a contact area on a portion of the internal wall of the tube to bear against a lateral surface of the lens, extends towards at least one end of the tube, and is electrically isolated from said first metallization.

2. The barrel of claim 1, further comprising a third metallization, electrically isolated from said first and second metallizations, and arranged in a second channel extending in the internal wall from one end of the tube to the other end of the tube.

3. The barrel of claim 1 wherein the first metallization extends towards both ends of the tube.

4. The barrel of claim 1, comprising a drop of conductive glue at each location where there is a contact between a metallization of the tube and the lens.

5. The barrel of claim 1 wherein each bump comprises a groove between the bearing surface and the internal tube wall.

6. The barrel of claim 1, comprising an electrically-controllable variable focal length lens positioned inside the tube.

7. The barrel of claim 2 wherein the first, second, and third metallizations each extend to both ends of the tube and on end surfaces of the tube.

8. The barrel of claim 6, comprising at least one of another electrically-controllable variable focal length lens and a fixed lens, positioned inside the tube.

9. A photographic device comprising:
a lens having a button-battery type housing;
a hollow isolating cylindrical tube having first and second ends and an inner diameter substantially equal to a diameter of the lens housing;
a bump extending radially from an internal wall of the cylindrical tube towards the inside of the tube and forming a bearing surface for a periphery of the lens;
a first metallization extending on said bearing surface and therefrom in a first channel formed in an internal wall of the tube towards at least one end of the tube; and
a second metallization forming a contact area on a portion of the internal wall of the tube to bear against a lateral surface of the lens, and extending towards at least one end of the tube.

10. The device of claim 9, comprising a third metalization extending, in a second channel formed in the internal wall of the tube, from the first end to the second end of the tube.

11. The device of claim 9 wherein each of the first and second metallizations extends onto an end surface of the tube.

12. The device of claim 9 wherein the bump is one of a plurality of bumps extending radially towards the inside of the tube in a same radial plane, each forming a bearing surface for a periphery of the lens.

13. A device, comprising:
a cylindrical tube;
a bump formed on an inner surface of the tube and having a bearing surface;
a first metallization extending on the bearing surface and along the inner surface of the tube to an end of the tube; and
a second metallization, electrically isolated from the first metallization, extending along the inner surface of the tube to an end of the tube.

14. The device of claim 13, comprising a channel formed in the inner surface of the tube and in which the first metallization extends.

15. The device of claim 13, comprising a channel formed in the inner surface of the tube and in which a third metallization extends from a first to a second end of the tube.

16. The device of claim 13 wherein an end of the tube includes a shoulder region configured to receive an end of an additional tube.

17. The device of claim 13, comprising a lens, having a button-battery type housing, positioned within the tube such that a first electrode of the lens is in electrical contact with the second metallization and a second electrode of the lens bears against the bearing surface of the bump and is in electrical contact with the first metallization.

18. The device of claim 17, comprising an additional tube positioned concentrically with the tube, and coupled thereto in a stacked configuration.

19. The device of claim 17, comprising an additional lens positioned within the tube.

20. The device of claim 17, comprising a camera to which the tube is coupled in a position corresponding to an optical sensor network.

21. The device of claim 20, comprising a cellular telephone, of which the camera is a part.

* * * * *

UNITED STATES PATENT AND TRADEMARK OFFICE
CERTIFICATE OF CORRECTION

PATENT NO. : 7,668,449 B2  Page 1 of 1
APPLICATION NO. : 11/534141
DATED : February 23, 2010
INVENTOR(S) : Saugier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 500 days.

Signed and Sealed this

Seventh Day of December, 2010

David J. Kappos
*Director of the United States Patent and Trademark Office*